UNITED STATES PATENT OFFICE.

ALFRED H. WHITE, OF ANN ARBOR, MICHIGAN.

PROCESS OF DESTRUCTIVELY DECOMPOSING LIQUIDS OF HIGH ORGANIC CONTENT AND PRODUCT OF SUCH PROCESS.

1,374,889.     Specification of Letters Patent.     Patented Apr. 12, 1921.

No Drawing.     Application filed July 24, 1919. Serial No. 312,939.

*To all whom it may concern:*

Be it known that I, ALFRED H. WHITE, a citizen of the United States, residing at Ann Arbor, county of Washtenaw, State of Michigan, have invented certain new and useful Improvements in Processes of Destructively Decomposing Liquids of High Organic Content and Product of Such Processes, of which the following is a specification.

This invention relates to the destructive distillation of liquids carrying either in suspension or solution relatively large quantities of organic matter and especially the waste liquors (in the manufacture of wood pulp) and has for its primary objects the economic production of valuable by-products such as methyl alcohol, acetone and other useful products as well as the effective automatic chemical control of such distillation, whereby accidental over-heating is effectively prevented.

Heretofore it has been proposed (see U. S. Patent No. 1,298,594) to causticize wood pulp waste liquors by the treatment of the concentrated liquors with relatively large quantities of quick-lime, for example, to the extent of about 40 to 60%, in order to generate large quantities of steam and effect the solidification of the causticized material in the form of a highly porous structure. The product thus obtained was then calcined or distilled in an externally heated retort, preferably while steam, either wet or superheated, was being simultaneously introduced into the retort, in order to obtain volatile products and a highly alkaline residue. Such a procedure differs radically from that herein described, especially in so far as the quantities of lime and the temperature employed are concerned, as well as with respect to the control of the process and the character of the resultant product, all of which are hereinafter more fully set forth in detail.

In my prior patent, No. 1,197,983, the importance of controlling the temperature in the destructive distillation of waste soda-pulp liquors within the limits of from 450–700° F. is emphasized. My further investigations have led to the discovery that such temperature control can be accomplished chemically by the utilization of the heat of formation and dissociation of calcium hydroxid to accomplish such control; however, it is essential that extremely large quantities of lime be employed, preferably substantially the quantity which is required to combine chemically with the water present in the concentrated liquors treated to form calcium hydrate $(Ca(OH)_2)$. Theoretically, each pound of water reacts with 3.1 of calcium oxid, which is equivalent to about 1.55 lbs. of calcium oxid or 1.7 lbs. of a good grade commercial lime to each pound of concentrated (50%) waste liquor from wood pulp manufacture. The amount of heat generated when these quantities of materials react is somewhat greater than is required for accomplishing the objects of my invention, wherein a temperature of not exceeding about 370° C. is preferably maintained and accordingly if proper provisions are made against the loss of heat by radiation and other external causes, it is possible by effecting very intimate mixing of the materials to reduce the amount of lime required somewhat below the aforesaid theoretical quantity, but in no event should less than pound for pound of the 50% concentrated waste wood pulp liquor and commercial quick lime be used.

In carrying out my invention, I preferably proceed as follows:

The concentrated black liquor from soda pulp mills of preferably 40° Baumé is first intimately mixed with a good grade of commercial powdered lime preferably about 80 mesh. Any suitable mixer may be used such, for example, as the ordinary concrete or dough mixer and preferably the proportions employed are approximately three pounds of lime to each pound of water in the black liquor or 1.5 pounds of lime to each pound of 40° Bé. liquor. When mixed, the material will be either in the form of an almost dry powder or in the form of loose balls, depending on the method of mixing employed. Before the mixture heats up sufficiently to distil off valuable volatile products of decomposition, a batch of this material is placed in a suitable furnace—a rotary retort, for example, which is preferably still hot from a preceding charge. An application of external heat at this stage will accelerate the commencement of the operation. As soon as the reaction starts at one point, it progresses rapidly and evenly throughout the whole mass until the temperature is attained at which rapid destructive distillation commences (approximately 200° C.), whereupon water, methyl alcohol, acetone and other products are rapidly and simultaneously evolved. The temperature will continue to rise, owing to the autogenous heat, i. e., the heat of reaction generated, until the heat absorbed by the decomposition of the calcium hydrate checks the temperature rise at about 425° C. The products evolved during the later stage of the process are largely light oils which float upon the alcoholic solution. Objectionable tarry products are almost entirely absent. The solid residue is still light brown in color but if kept long at a temperature of 370+125° C. it decomposes somewhat and becomes black with evolution of tarry products. It thus becomes possible, by the use of a separate condenser or receiver, to separate the bulk of the alcohol and light oils from the tarry products, thereby making it easier to refine the former.

When the distillation has progressed to the desired extent the solid material is discharged from the furnace and a new charge is added. The light brown solid residue, which is the product of incomplete destructive distillation, catches fire readily in the air and burns, under favorable conditions, to a white ash with regeneration of most of the quick lime, but under less favorable conditions to a black ash, which on leaching gives a colorless solution containing caustic soda.

The gases from the combustion of the discharged solid residue may profitably be passed around the furnace or retort to both prevent loss of heat by radiation and also to provide the heat necessary to promptly initiate the chemical reaction within the retort.

The calcined ash carries about eight to ten per cent. sodium carbonate and may be leached at once if desired or it may be mixed with fresh liquor without leaching and passed through the retort again thereby raising the concentration of the soda and decreasing the leaching cost.

The process is above described as a batch process in a rotary retort, but it may, however, be made a continuous one in a suitable rotating retort of common type by continuously introducing the fresh material and withdrawing the gases at one end and taking the black ash out of the other end. The material may, if desired, also be continuously conveyed through a fixed retort by a worm or other form of conveyer. A retort may also be used which does not provide any form of mechanical agitation provided means are provided for taking care of the sudden swelling of the mass and the evolution of vapors caused by the sudden chemical reaction.

Not only does the calcium oxid reacting with water liberate sufficient heat to raise the temperature of the mass to that required for destructive distillation, but raises it quickly and homogeneously throughout the entire mass and not locally as would be the case were the heat applied externally. Moreover, under no circumstances can the temperature accidentally rise above about 425° C., since at about 370° C. the calcium hydroxid previously formed commences to dissociate with absorption of heat, thus hindering any further rise of temperature. This process, therefore, gives an automatic temperature control entirely independent of external agencies.

The retort in which the process is carried out may be of any desirable size or shape and, if desired, external heat may also be used to supplement the internal heat without danger of overheating the materials undergoing reaction.

In the above illustration I have used sufficient lime to react theoretically with all of the water present. The amount to be added may, however, be either greater or less than this. The object is to use the heat generated by chemical action within the retort to cause destructive distillation. With finely powdered lime, intimate mixture and a small addition of external heat, 1.5 pounds of lime for each pound of water is adequate. If the lime is not of best quality and does not react readily, it will soak up the liquid and yield a dry enough product to be handled in a conveyer but external heat may be needed to start the reaction in the retort and to carry it to completion. The amount of quick-lime added should preferably be enough so that the material is not sticky and is dry enough to be handled by a conveyer as it leaves the mixing machine, and furthermore all heat of chemical reaction should be conserved to raise the temperature within the retort.

As previously described, by my process it is possible to not only develop heat evenly within and throughout the mass by utilizing the large amount of heat of reaction released on the conversion of quicklime into calcium hydrate, but it is also possible as the result of the relatively low dissociation point of calcium hydrate into calcium oxid or quicklime, to automatically control the upper limits of the temperature and to check the rise of the same substantially above about 425° C. except momentarily and locally in the mass.

Obviously, if a more concentrated liquor than the 40° Baume' be used, proportionally less lime may be added to correspond to the amount of water present, but an excess of lime is not detrimental and unless the lime is finely ground and the mixture is intimate, it is desirable to add somewhat more than the amount theoretically required.

The residue obtained from this process after the leaching out of the caustic soda is particularly adaptable for wall plaster purposes, since it constitutes a calcium hydrate, being principally calcium hydroxid, which is intimately associated with protective colloid material and a relatively small amount of carbonaceous matter and a relatively small amount of carbonaceous matter that is admirably adapted to form a mortar having highly desirable setting qualities. Accordingly, it may be sold directly for use as a masonry material or may, if desired, be regenerated as quick lime for use in the second cycle of the process.

The above mentioned residue obtained after several cycles of the process have been completed, will have about 85% of calcium carbonate, or the equivalent amount of calcium hydroxid, and carbon. This approximates the same proportions of mineral to carbon that there is in bone-black, only the mineral matter is in this case calcium carbonate or calcium hydroxid, depending upon the temperature of calcination, instead of calcium phosphate. Moreover, not only is the carbon distributed very freely over the mineral matter, but by simple solution of the mineral matter in acid, it is possible to obtain a remarkably porous and absorbent material suitable for solution-decolorizing or gas absorption purposes.

Wherever the term "containing" is used herein with reference to organic material, it is understood that it is intended to include organic material either in suspension or in solution.

Having thus described my invention what I claim and desire to secure by Letters Patent is:

1. The cyclic process of decomposing an aqueous liquid containing a large amount of organic matter and capable of yielding valuable carbon compounds upon destructive distillation, which consists in intimately mixing such aqueous liquid in a concentrated condition with sufficient quick-lime to autogenously heat up the mass to a temperature at which destructive distillation occurs, then distilling off the volatile carbon compounds while supplying at least the major portion of the heat required for such distillation autogenously from the reaction of the said mixture whereby the non-volatile residue is obtained separately from the volatile constituent, and then calcining the calcium compounds contained in said residue at a sufficient temperature to substantially convert the same into quick-lime for reuse in said process.

2. The process of decomposing an aqueous liquid containing a large amount of organic matter and capable of yielding valuable carbon compounds upon destructive distillation, which consists in intimately mixing such an aqueous liquid in a concentrated condition with sufficient quick-lime to autogenously heat up the mass to a temperature at which destructive distillation occurs, then distilling off volatile carbon compounds while supplying at least the major portion of the heat required for such distillation autogenously from the reaction of the said mixture, and collecting the volatile constituents so distilled.

3. The process of decomposing waste liquors from soda-pulp manufacture in order to obtain valuable products including methyl alcohol and acetone, which consists in first concentrating such liquors, intimately mixing the same with sufficient quick-lime to autogenously heat up the mass to a temperature at which methyl alcohol and acetone will be formed by destructive decomposition, then distilling off the methyl alcohol and acetone so formed while supplying at least the major portion of the heat required for such distillation autogenously from the reaction of the said mixture, and collecting the volatile constituents so distilled.

4. The process of recovering alkaline compounds of alkali-metals from aqueous liquids containing the same together with large amounts of organic matter in solution or suspension, which consists in intimately mixing with such liquids while in a concentrated condition a sufficient amount of quick-lime to autogenously heat up the mass on standing to a temperature at which destructive distillation occurs, delivering the mixture when in a self-sustaining approximately dry condition to a conveyer, introducing the mixture into a retort and therein distilling off volatile carbon compounds while supplying at least the major portion of the heat required for such distillation autogenously from the reaction of the said mixture, dissolving and removing the soluble salts from the insoluble residue, calcining the calcium compound contained in the resultant residue, using this calcined material to mix with the new portion of liquid and reburning the calcium compounds contained in the resultant residue, repeating the cycle until the alkaline salts of alkali-metals in the residue has increased substantially in excess of the amount obtained from a single cycle and finally leaching the residual black ash in order to extract such alkaline salts therefrom and to recover calcium compounds substantially free from such alkaline salts of alkali-metals.

5. The process of decomposing concentrated aqueous liquids containing large amounts of organic matter, which consists in intimately mixing therewith sufficient quick-lime to autogenously heat up the mass by the utilization of the aforesaid autogenous heat of the mass to a temperature in excess of 200° C., then distilling off volatile carbon compounds resulting from the destructive distillation of the organic matter principally without the application of external heat.

6. The process of decomposing an aqueous liquid containing a large amount of organic matter and capable of yielding valuable carbon compounds upon destructive distillation, which consists in intimately mixing with such an aqueous liquid in a concentrated condition a sufficient amount of quick-lime to autogenously heat the entire mass to a temperature of at least 200° C. and to prevent the temperature exceeding about 425° C. due to the decomposition of the calcium hydrate and consequent absorption of heat when such temperature is approximated, and then distilling off volatile carbon compounds from the mixture principally without the application of external heat.

7. In the process of decomposing an aqueous liquid containing a large amount of organic matter and capable of yielding valuable hydrocarbon derivatives upon destructive distillation, the step which consists in intimately mixing with such an aqueous liquid in a concentrated condition a sufficient amount of quick-lime to autogenously heat the entire mass to a temperature of at least 200° C. and to prevent the temperature exceeding about 425° C. due to the decomposition of the calcium hydrate and consequent absorption of heat when the temperature is approximated.

8. In the process of decomposing waste liquors from soda-pulp manufacture, the step which consists in intimately mixing with such an aqueous liquid in a concentrated condition a sufficient amount of quick-lime to autogenously heat the entire mass to a temperature of at least 200° C. and to prevent the temperature exceeding about 425° C. due to the decomposition of the calcium hydrate and consequent absorption of heat when the temperature is approximated.

ALFRED H. WHITE.